US008753596B2

(12) United States Patent
Spurk et al.

(10) Patent No.: US 8,753,596 B2
(45) Date of Patent: Jun. 17, 2014

(54) CATALYST FOR REMOVING NITROGEN OXIDES FROM THE EXHAUST GAS OF DIESEL ENGINES (75) Inventors: Paul Spurk, Weiterstadt (DE); Nicola Soeger, Nidderau (DE); Elena Mueller, Pfungstadt (DE); Stephan Malmberg, Frankfurt (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 13/819,213

(22) PCT Filed: Sep. 8, 2011

(86) PCT No.: PCT/EP2011/065533
§ 371 (c)(1),
(2), (4) Date: Feb. 26, 2013

(87) PCT Pub. No.: WO2012/034922
PCT Pub. Date: Mar. 22, 2012

(65) Prior Publication Data
US 2013/0156668 A1    Jun. 20, 2013

(30) Foreign Application Priority Data

Sep. 13, 2010 (EP) .................................... 10009478

(51) Int. Cl.
B01D 53/94 (2006.01)
B01J 29/00 (2006.01)
B01J 29/83 (2006.01)
B01J 29/85 (2006.01)
F01N 3/10 (2006.01)
F01N 3/28 (2006.01)

(52) U.S. Cl.
USPC ............... 423/213.2; 423/213.5; 423/213.7; 60/274; 60/299; 60/301; 502/60; 502/64; 502/345; 502/302; 502/340; 502/344; 502/325; 502/527.12

(58) Field of Classification Search
USPC ............. 502/60, 64, 345, 302, 340, 344, 325, 502/527.12; 423/213.2, 213.5, 213.7; 60/274, 299, 301
See application file for complete search history.

(56) References Cited

U.S. PATENT DOCUMENTS

| 5,756,057 | A | 5/1998 | Tsuchitani et al. |
| 6,089,015 | A | 7/2000 | Strehlau et al. |
| 6,725,647 | B2 | 4/2004 | Pfeifer et al. |
| 7,160,832 | B2 | 1/2007 | Crocker et al. |
| 7,431,895 | B2 | 10/2008 | Pfeifer et al. |
| 8,226,896 | B2 | 7/2012 | Pfeifer et al. |
| 2002/0057997 | A1* | 5/2002 | Mizuno et al. ................ 422/171 |
| 2007/0089403 | A1 | 4/2007 | Pfeifer et al. |
| 2009/0288402 | A1 | 11/2009 | Voss et al. |
| 2010/0037597 | A1 | 2/2010 | Eckhoff et al. |
| 2010/0199635 | A1 | 8/2010 | Akama et al. |
| 2012/0110988 | A1* | 5/2012 | Dotzel et al. ..................... 60/299 |
| 2012/0167553 | A1* | 7/2012 | Qi et al. .......................... 60/274 |
| 2012/0315206 | A1* | 12/2012 | Jensen et al. ................ 423/239.1 |
| 2013/0142727 | A1* | 6/2013 | Li et al. ......................... 423/709 |

FOREIGN PATENT DOCUMENTS

| DE | 198 06 062 A1 | 8/1999 |
| DE | 101 04 160 A1 | 8/2002 |
| DE | 10 2004 012 272 A1 | 9/2004 |
| DE | 103 08 287 A1 | 9/2004 |
| EP | 0 666 099 A1 | 8/1995 |
| EP | 0 879 633 A2 | 11/1998 |
| EP | 1 203 611 A1 | 5/2002 |
| EP | 1 961 933 A1 | 8/2008 |
| WO | 2008/077602 A1 | 7/2008 |

OTHER PUBLICATIONS

International Search Report for PCT/EP2011/065533 mailed Nov. 10, 2011 (in English).
Naoto Miyoshi, et al., "Development of New Concept Three-Way Catalyst for Automotive Lean-Burn Engines", SAE Technical, International Congress and Eposition, Detroit, Michigan, Feb. 27-Mar. 1995, pp. 121-130 (SAE 950809).
Xiao, J., Diffusion Mechanism of Hydrocarbons in Zeolites, Mass. Institute of Technology, Apr. 1990, pp. 1-195.

* cited by examiner

Primary Examiner — Timothy Vanoy
(74) Attorney, Agent, or Firm — Smith, Gambrell & Russell, LLP (57) ABSTRACT The invention relates to a catalyst for removal of nitrogen oxides from the exhaust gas of diesel engines, and to a process for reducing the level of nitrogen oxides in the exhaust gas of diesel engines. The catalyst consists of a support body of length L and of a catalytically active coating which in turn may be formed from one or more material zones. The material zones comprise a copper-containing zeolite or a zeolite-like compound. The materials used include chabazite, SAPO-34, ALPO-34 and zeolite β. In addition, the material zones comprise at least one compound selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate and mixtures thereof. Noble metal may optionally also be present in the catalyst.

20 Claims, 3 Drawing Sheets

CATALYST FOR REMOVING NITROGEN OXIDES FROM THE EXHAUST GAS OF DIESEL ENGINES

The invention relates to a catalyst for removal of nitrogen oxides from the exhaust gas of diesel engines, and to a process for reducing the level of nitrogen oxides in the exhaust gas of diesel engines.

The exhaust gas of diesel engines comprises soot particles (PM) and nitrogen oxides ($NO_x$), as well as the carbon monoxide (CO) and hydrocarbon (HC) pollutant gases resulting from incomplete combustion of the fuel. In addition, the exhaust gas of diesel engines contains up to 15% by volume of oxygen. It is known that the oxidizable CO and HC pollutant gases can be converted to harmless carbon dioxide ($CO_2$) by passing them over a suitable oxidation catalyst, and particulates can be removed by passing the exhaust gas through a suitable soot particle filter.

The reductive removal of nitrogen oxides ("denoxing") is much more difficult due to the high oxygen content of the diesel exhaust gases. A known denoxing process is called the SCR process (SCR=Selective Catalytic Reduction), i.e. the selective catalytic reduction of the nitrogen oxides with the reducing agent ammonia over a catalyst suitable therefor, the SCR catalyst. Ammonia can be added to the exhaust gas stream as such or in the form of a precursor compound decomposable to ammonia under ambient conditions, "ambient conditions" being understood to mean the environment of the compound decomposable to ammonia in the exhaust gas stream upstream of the SCR catalyst. The performance of the SCR process requires a source for provision of the reducing agent, an injection apparatus for metered addition of the reducing agent to the exhaust gas as required, and an SCR catalyst arranged in the flow path of the exhaust gas. The totality of reducing agent source, SCR catalyst and injection device arranged on the inflow side with respect to the SCR catalyst is also referred to as SCR system.

In addition, nitrogen oxide storage catalysts can be used for denoxing of diesel exhaust gases. The mode of operation thereof is described in detail in the SAE document SAE 950809. The cleaning action of the nitrogen oxide storage catalysts is based on storage, in a lean operating phase of the engine, of the nitrogen oxides by the storage material of the storage catalyst, predominantly in the form of nitrates. In a subsequent rich operating phase of the engine, the nitrates formed beforehand are decomposed and the nitrogen oxides released again are reacted with the reducing exhaust gas components over the storage catalyst to give nitrogen, carbon dioxide and water.

Combination processes for denoxing of internal combustion engine exhaust gases, in which SCR catalysts and nitrogen oxide storage catalysts are used, have also already been described. In these combination systems, the nitrogen oxide storage catalyst is generally connected upstream of the SCR catalyst on the inflow side, and serves to produce ammonia during a rich operating phase, which is then stored in the downstream SCR catalyst. Nitrogen oxides which break through the nitrogen oxide storage catalyst due to inadequate dynamic storage capacity during the subsequent lean operating phase can be reduced to nitrogen with the aid of this stored ammonia on the downstream SCR catalyst. Corresponding systems have been described, for example, in DE 10104160, DE 10308287 and WO 2008/0077602.

Inverse system configurations with a nitrogen oxide storage catalyst arranged on the outflow side with respect to the SCR catalyst have also already been proposed, for example in EP 0 879 633 and U.S. Pat. No. 7,160,832.

In addition, the prior art discloses catalysts which both have nitrogen oxide-storing action and are capable of catalyzing the selective catalytic reduction of nitrogen with ammonia. EP 1 203 611 discloses an exhaust gas cleaning apparatus for selective catalytic reduction of nitrogen oxides under lean exhaust gas conditions, this comprising at least one catalyst with a catalytically active component for selective catalytic reduction (SCR component) and additionally at least one nitrogen oxide storage component ($NO_x$ component). The catalyst is operated by the urea SCR process, i.e. the reducing agent used for nitrogen oxides is ammonia, which is produced from urea added to the lean exhaust gas.

DE 198 06 062 also discloses a reduction catalyst for reducing the level of pollutants in diesel engine exhaust gases, which comprises, in its active composition, an $NO_x$ storage material as well as an SCR catalyst material based on the catalytically active oxides $TiO_2$, $WO_3$, $MoO_3$ and $V_2O_5$. The $NO_x$ storage material comprises, as an active component, at least one high-surface area inorganic oxide which is preferably selected from the group of $Al_2O_3$, $SiO_2$, $ZrO_2$, zeolites and sheet silicates.

EP 0 666 099 describes a process for removing nitrogen oxides from oxidizing exhaust gases, which are passed over a specific catalyst which stores the nitrogen oxides, and then a reducing agent is periodically added to the exhaust gas, which reduces the nitrogen oxides adsorbed in the catalyst to nitrogen. The catalyst comprises inorganic oxides and catalytically active components. The catalytically active components comprise firstly noble metals selected from platinum, palladium, rhodium and ruthenium, and secondly at least one alkali metal and/or alkaline earth metal. In addition, the catalyst may comprise heavy metals selected from manganese, copper, cobalt, molybdenum, tungsten and vanadium or compounds thereof.

At present, the SCR process for denoxing of diesel exhaust gases is considered to be the most promising cleaning process for nitrogen oxides for applications in passenger vehicles and for standard use in utility vehicles. Especially in the case of passenger vehicles, however, it should be noted that the temperatures of the exhaust gas to be cleaned which occur in the NEDC ("New European Driving Cycle") are shifting ever further into the colder range. Since metered addition of urea as a source for the ammonia reducing agent is possible in a controlled manner only at temperatures from 180° C. without accepting unwanted deposits of urea and conversion products in the exhaust gas system, the result of this evolution in the exhaust gas temperatures is that the SCR process can no longer effectively be employed in the "urban part" (ECE) of the NEDC. Nitrogen oxide breakthroughs during the ECE and hence exceedance of the prescribed $NO_x$ limits in the overall NEDC driving cycle are the consequence.

It is an object of the present invention to provide a catalyst and an exhaust gas cleaning process which, compared to the systems from the prior art, exhibits improved $NO_x$ conversion performance over the entire NEDC-relevant temperature range, but especially at relatively low temperatures, for example between 100 and 250° C.

The object is achieved by a catalyst for removal of nitrogen oxides from the exhaust gas of diesel engines, consisting of a support body of length L and of a catalytically active coating composed of one or more material zones comprising:

a zeolite or a zeolite-like compound containing 1-10% by weight of copper, based on the total weight of the zeolite or of the zeolite-like compound, the zeolite or the zeolite-like compound being selected from the group consisting of chabazite, SAPO-34, ALPO-34 and zeolite β; and at least one compound selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate and mixtures thereof, and by a process for removing nitrogen oxides from the exhaust gas of diesel engines, the exhaust gas to be cleaned having an air ratio λ greater than 1 and being passed over an inventive catalyst.

The effect of the particular composition of the inventive catalyst is that the nitrogen oxides present in the exhaust gas to be cleaned can be stored in the catalyst in the form of nitrates at temperatures less than or equal to 200° C. As a result, nitrogen oxide breakthroughs in the catalyst are very substantially avoided in temperature ranges in which metered addition of urea is not yet possible in a viable manner. If the exhaust gas temperatures exceed 200° C., such that metered addition of the urea reducing agent proportionate to the demand is possible in a controlled manner, the nitrogen oxides stored in the catalyst at colder temperatures are released again and reduced selectively with ammonia to nitrogen. As a result of the synergistic interaction of the components present in the catalyst, the NOx conversion is thus much enhanced over the entire NEDC-relevant temperature range, but especially at lower temperatures, for example between 100 and 250° C., compared to prior art systems.

Preferably, the zeolite for use in the inventive catalyst, or the zeolite-like compound, has an average pore size of less than 4 ångström and is selected from the group consisting of chabazite, SAPO-34 and ALPO-34. Zeolites or zeolite-like compounds of this type have the advantage that the pores present therein are large enough to be able to store ammonia and/or nitrogen oxides. Any short-chain hydrocarbons likewise present in the exhaust gas to be cleaned, however, cannot be stored within the pore structure of the zeolite or of the zeolite-like compound as a result of the small pore sizes. Reversible blockage both of the storage positions for ammonia and/or nitrogen oxides and of the SCR-catalytically active sites present in the zeolite or zeolite-like compound by hydrocarbons is thus effectively avoided. The effect of this is that the resulting catalyst, among other features, has excellent lightoff performance in the SCR reaction, even at elevated hydrocarbon concentrations in the exhaust gas.

In addition, the catalytically active coating, in preferred embodiments of the inventive catalyst, additionally comprises cerium oxide and/or cerium/zirconium mixed oxide. Cerium oxides or cerium/zirconium mixed oxides, especially when they are cerium-rich, i.e. have cerium oxide contents greater than 40% by weight, more preferably greater than 60% by weight, based in each case on the total weight of the cerium/zirconium mixed oxide, have a promoting effect on the nitrogen oxide storage capacity in the low-temperature range to 200° C. In order to ensure particularly intimate contact with other nitrogen oxide-storing materials in the inventive catalyst, the cerium oxide and/or cerium/zirconium mixed oxide is most preferably used as a support oxide for the compound selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate and mixtures. This distinctly improves the ability of the inventive catalyst, in the low-temperature range to 200° C., to dynamically store nitrogen oxides in the form of nitrates and to release them again rapidly at higher temperatures.

Both the rate of the SCR reaction and the effectiveness of the storage of nitrogen oxides in the form of nitrates depends on the $NO/NO_2$ ratio in the exhaust gas to be cleaned. For example, the SCR reaction proceeds most rapidly when the $NO/NO_2$ ratio is around 1. The storage of the nitrogen oxides in the form of nitrates proceeds the most rapidly in the case of some storing materials, for example barium oxide, when a maximum amount of the NO present in the exhaust gas has been oxidized beforehand to $NO_2$. In both reactions, the $NO/NO_2$ ratio can be adjusted in situ over the catalyst surface in a step preceding the actual target reaction. For this purpose, preferred embodiments of the inventive catalyst additionally comprise, in the catalytically active coating, one or more noble metals selected from the group consisting of platinum, palladium, rhodium, iridium, ruthenium, gold, silver and mixtures and/or alloys thereof. Particular preference is given to the platinum group metals platinum, palladium, rhodium, ruthenium and mixtures and/or alloys thereof. The type and amount of the noble metals for use in the catalytic coating should be selected such that the resulting catalyst does not have any significant ammonia oxidation capacity in the application-relevant temperature range. The preferable selection of noble metals and of the concentration thereof is also determined by the overall composition of the catalyst and becomes apparent to the person skilled in the art from the customary optimization tests.

The components present in the catalyst may be present in a homogeneous coating on the support body. In applications in which the inventive catalyst is exposed to moderate exhaust gas temperatures by the end of its intended utilization and/or in which an ammonia barrier catalyst of sufficient dimensions is connected downstream of the inventive catalyst, good denoxing results are achieved with such embodiments.

Preference is given, however, to embodiments in which the catalytically active coating consists of two material zones, the first material zone comprising the zeolite or the zeolite-like compound, while the compound selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate and mixtures thereof is present in the second material zone. A fact of particular significance is the spatial separation of different components present in the catalyst into two material zones from which the catalytically active coating is composed when the selected embodiment comprises noble metal. In this case, it is advisable that the first material zone comprises the zeolite or the zeolite-like compound, while the noble metal selected from the group consisting of platinum, palladium, rhodium, iridium, ruthenium, gold, silver and mixtures and/or alloys thereof is present in the second material zone. The spatial separation of the noble metal and of the zeolite or the zeolite-like compound ensures that the inventive catalyst has excellent selectivity for nitrogen even at relatively high exhaust gas temperatures in the SCR reaction. As a result, under suitable operating conditions, little $NO_x$ is formed from the over oxidation of excess ammonia.

Embodiments of the inventive catalyst in which two different material zones are present may in principle be configured as layer catalysts or as zone catalysts. For production of such catalysts, two coating suspensions of different compositions are used to provide a ceramic or metal flow honeycomb preferably used as the support body with the appropriate catalytically active coating components which form the material zones.

Figure 1A:
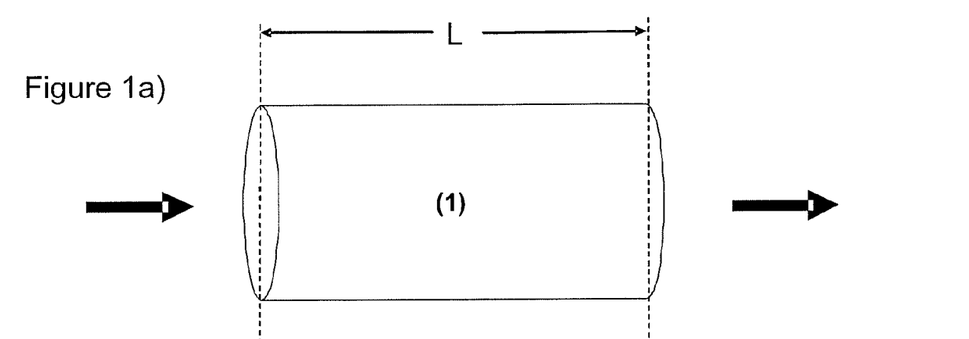
FIG. 1a) shows an isometric view of the coated flow honeycomb (1)
Figure 1B:
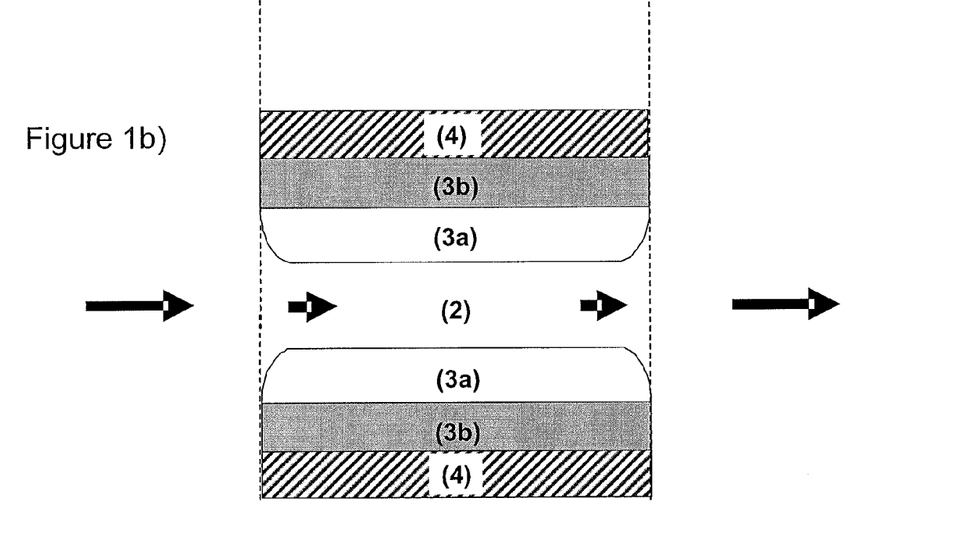
FIG. 1b) shows a section from the coated flow honeycomb comprise an individual flow channel (2) with the coating applied to the gas-tight walls (4) thereof.

For production of a layer catalyst, a catalytically active layer is first applied over the entire length of the support body with a coating suspension of corresponding composition by one of the conventional dipping, sucking and/or pumping processes. After drying and optional calcination of this first layer, the operation is repeated with a second coating suspension of different composition, such that a second catalytically active coating component (material zone) forms on the first catalytically active coating component. In the finished layer catalyst, one material zone has thus been applied directly to the support body and covers the entire length L thereof. The other material zone has been applied on top of this and covers that material zone completely on the exhaust gas side. FIG. 1 shows the schematic structure of such a layer catalyst, FIG. 1a) showing an overview of the coated flow honeycomb (1): FIG. 1b shows a schematic of an individual flow channel (2) as a section from the layer catalyst. The two superposed material zones (3a and 3b) are arranged therein on the gas-tight walls (4) which bound the flow channel, and these form the composition of the catalytically active coating of preferred embodiments of the inventive catalyst. The arrows indicate the flow direction of the exhaust gas to be cleaned.

Figure 2A:
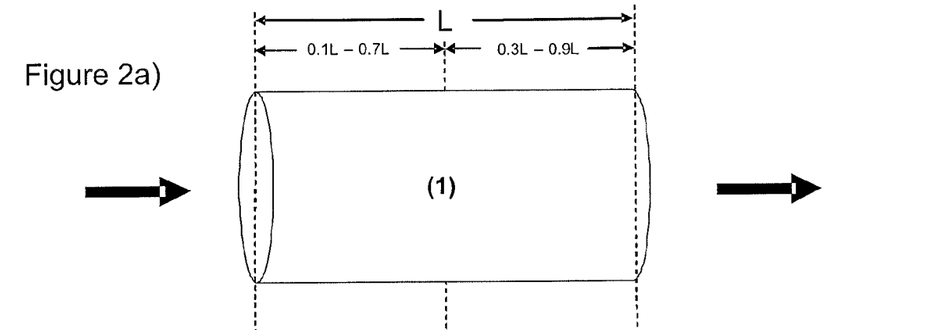
FIG. 2a) shows an isometric view of the coated flow honeycomb (1)
Figure 2B:
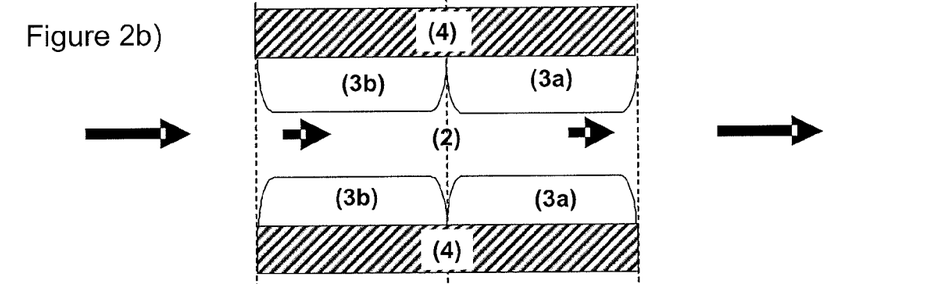
Figure 2C:
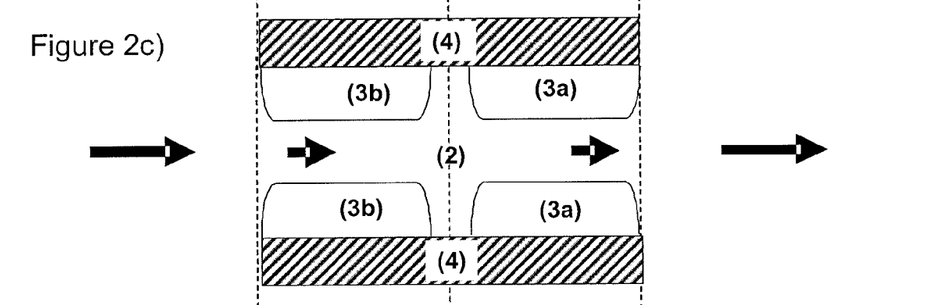
FIG. 2c): shows a "Zone coating with clear gap" embodiment.
Figure 2D:
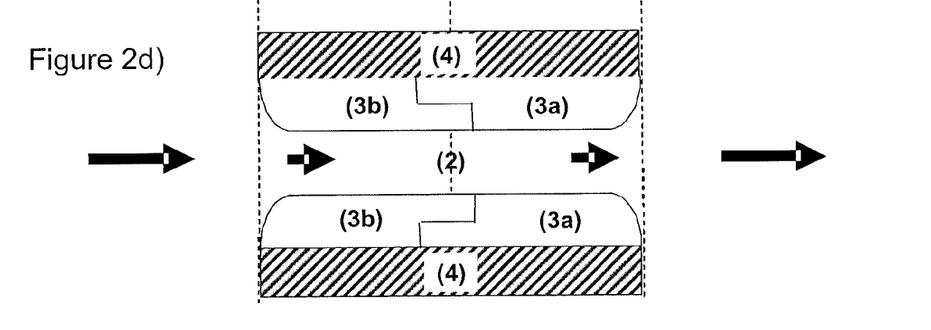
FIG. 2d): shows a "Coating with overlapping zones" embodiment.

In a zone catalyst, the two material zones are arranged successively on the support body in flow direction of the exhaust gas and form an inflow-side and an outflow-side zone. For production of the first zone, a coating suspension of suitable composition is introduced into the ceramic or metal flow honeycomb preferably utilized as the support body by one of the conventional dipping, sucking and/or pumping processes, for example from the later inflow side of the catalyst. The application ends, however, after a defined distance in the support body which is smaller than the length of the support body L. After drying and optional calcination of the resulting portion, the second zone is produced by introducing the second coating suspension proceeding from the other side, for example the later outflow side of the catalyst. The application thereof likewise ends after a defined distance in the support body which is less than the length L of the support body. FIG. 2 shows the schematic construction of such a zone catalyst, FIG. 2a) showing an overview of the coated flow honeycomb (1). FIGS. 2b to 2d show, in schematic view, an individual flow channel (2) as a section from the zone catalyst and the coating components (material zones) arranged therein on the walls (4) which bound the flow channel. The length of the zones can be selected in the course of coating such that the material zones at a selected point are in contact with a partial length section of the support body ("zones end to end"; FIG. 2b). It is likewise possible to select the zone lengths such that there is an overlap in the intermediate region (FIG. 2d). The zone lengths are preferably selected such that a gap remains between the two material zones (FIG. 2c). The gap is preferably between 2 and 10 millimeters, more preferably between 3 and 6 millimeters, in length. This embodiment has advantages especially in the case of noble metal-containing variants of the inventive catalyst, since intimate contact between the noble metal present in one material zone and the zeolite or zeolite-like compound present in the other material zone is completely prevented. This prevents thermally diffusive transfer of the noble metal to the zeolite or zeolite-like compound, the result of which is a higher selectivity for nitrogen in the resulting catalyst.

In the preferred embodiments of the inventive layer catalyst, the second material zone, which comprises the compounds selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate and mixtures thereof and/or noble metal, has been applied directly to the support body and covers it over the entire length L thereof. The first material zone comprising the copper-containing zeolite or the zeolite-like compound has been applied to the second material zone and covers it completely on the exhaust gas side. The result of this arrangement of the material zones is that nitrogen oxides which are desorbed from the second material zone can be reacted with ammonia to give nitrogen in the SCR-active material zone above it.

In the preferred embodiments of the inventive zone catalyst, in which the two material zones are arranged successively on the support body in flow direction of the exhaust gas, the second material zone covers 10 to 70% of the length L of the support body, calculated from the inflow end thereof, whereas the first material zone covers 30 to 90% of the length L of the support body, calculated from the outflow end thereof. This arrangement likewise has the advantage that nitrogen oxides which are desorbed from the second material zone which stores nitrogen oxides can be reacted with ammonia to give nitrogen in the first material zone arranged downstream on the outflow side. In addition, the arrangement of the second material zone on the inflow side ensures a maximum possible temperature level in the catalyst, which leads overall to optimal NOx storage rates, i.e. improved compared to the inverse arrangement, in the second material zone. As a further advantage of this arrangement, improved ammonia storage capacity of the SCR-active, first material zone arranged downstream on the outflow side is observed. However, it is also possible to arrange the zones in inverse arrangement, such that the first material zone comprising the zeolite or the zeolite-like compound is arranged on the inflow side, while the second material zone is arranged on the outflow side. In these cases, however, an additional SCR catalyst is preferably arranged downstream of the inventive catalyst in the exhaust gas cleaning system. This gives rise to an apparatus which, as well as an inventive catalyst, comprises an SCR catalyst arranged on the outflow side with respect to the inventive catalyst.

The inventive catalyst is suitable for removal of nitrogen oxides from the exhaust gas of diesel engines. Although the catalyst has the ability to store nitrogen oxides, it is not operated cyclically in alternately rich and lean exhaust gas. The exhaust gas to be cleaned has an air ratio λ greater than 1, and is passed over the inventive catalyst for denoxing. Preference is given to adding ammonia or a compound decomposable to ammonia as a reducing agent from a source independent of the engine to the exhaust gas to be cleaned prior to entry into the catalyst. Particular preference is given to the use of urea as the compound decomposable to ammonia, in which case this is not supplied to the exhaust gas to be cleaned until the temperatures are higher than or equal to 180° C. At temperatures lower than or equal to 200° C., the inventive catalyst over which the exhaust gas to be cleaned is passed stores nitrogen oxides in the form of nitrates. At temperatures higher than 200° C., these nitrogen oxides are released again. Still over the inventive catalyst, the selective catalytic reduction thereof with ammonia proceeds to give nitrogen.

According to the application, it may be advantageous to additionally pass the exhaust gas to be cleaned over a catalyst which predominantly accelerates the selective catalytic reduction of nitrogen oxides with ammonia. The supplementary aftertreatment over an SCR catalyst is advisable, for example, when there is a risk that nitrogen oxides at specific operating points will break through the inventive catalyst or be released from the nitrogen oxide stores present in the inventive catalyst without sufficient reduction of the nitrogen oxides to nitrogen still being possible over the inventive catalyst. This case can occur, for example, when configurations of the inventive catalyst are used in which the zeolite or the zeolite-like compound is used in the inflow zone. A corresponding system configuration could likewise be required if the zeolite or zeolite-like compound is present in the outflow zone, but the dimensions of the corresponding material zone are comparatively short. In such cases, it is necessary to integrate the inventive catalyst into an exhaust gas system which, as well as other exhaust gas cleaning units, for example diesel oxidation catalyst and/or diesel particulate filter, may also comprise other denoxing catalysts, preferably SCR catalysts.

The invention is illustrated in detail hereinafter by some figures and a working example. The figures show:

FIG. 1: schematic diagram of an inventive layer catalyst comprising a flow honeycomb (1) and the catalytically active coating (3), formed from two superposed material zones (3a and 3b).

Material zone (3a) comprises a zeolite or a zeolite-like compound selected from the group consisting of chabazite, SAPO-34, ALPO-34 and zeolite β, and comprising 1-10% by weight of copper, based on the total weight of the zeolite or of the zeolite-like compound.

Material zone (3b) comprises at least one compound selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate and mixtures thereof.

FIG. 2: schematic diagram of an inventive zone catalyst comprising a flow honeycomb (1) and the catalytically active coating (3), formed from two material zones (3a and 3b) arranged in succession.

Material zone (3a) comprises a zeolite or a zeolite-like compound selected from the group consisting of chabazite, SAPO-34, ALPO-34 and zeolite β, and comprising 1-10% by weight of copper, based on the total weight of the zeolite or of the zeolite-like compound.

Material zone (3b) comprises at least one compound selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate and mixtures thereof.

FIGS. 2b) to 2d) show an individual flow channel (2) as a section from the zone catalyst and the material zones arranged therein on the gas-tight walls (4) which bound the flow channel in various embodiments, wherein:

FIG. 2b): shows a "Zones end to end" embodiment;

EXAMPLE 1

An inventive catalyst was produced in the form of a layer catalyst according to FIG. 1.

To produce the second material zone (3b) to be applied directly to the honeycomb body, a coating suspension of the following composition was made up (the amounts are based on the volume L of the resulting catalyst):

| | |
|---|---|
| 45 g/L | of a lanthanum-doped aluminum/cerium mixed oxide; |
| 71 g/L | of a cerium oxide-doped aluminum/magnesium mixed oxide; |
| 1.06 g/L | of palladium; |
| 36 g/L | of cerium/zirconium mixed oxides with addition of 16.67% by weight of BaO; |
| 66 g/L | of cerium oxide; |

With one exception, all raw materials used are commercially available. Only the cerium/zirconium mixed oxide with added barium oxide is a self-produced powder component. It was produced by slurrying a commercially available cerium/zirconium mixed oxide in an aqueous barium acetate solution. The suspension thus obtained was dried at 120° C. over a period of 10 h and then calcined at 500° C. for two hours. The powder thus obtained was ground and used to produce the coating suspension.

The coating suspension thus obtained was used to coat a flow honeycomb with 62 cells per square centimeter, a cell wall thickness of 0.165 millimeter and a length of 76.2 mm in a customary dip coating process known to those skilled in the art. The component was dried and calcined at 500° C. for a duration of two hours.

For the production of the first material zone (3a), the coating suspension for a commercially available SCR catalyst comprising

| | |
|---|---|
| 27.8 g/L | of SAPO-34 exchanged with 3.0% by weight of copper; |
| 13.9 g/L | of an La$_2$O$_3$-stabilized cerium/zirconium mixed oxide; |
| 4.6 g/L | of an La$_2$O$_3$-stabilized aluminum oxide; |
| 4.6 g/L | of SiO$_2$ formed from commercially available silica sol | was produced. This suspension was used to coat the flow honeycomb which had already been coated once as described above once more. The component thus obtained was dried at 500° C. for a duration of two hours and then calcined.

COMPARATIVE EXAMPLE 1

The comparative catalyst used was a commercially available SCR catalyst whose composition corresponded to the first material zone (3a) in the inventive catalyst of example 1. The total loading of the comparative catalyst was 176 g/L of washcoat, based on the volume of the overall catalyst. The flow honeycomb used in the catalyst had 62 cells per square centimeter, a cell wall thickness of 0.165 millimeter and a length of 76.2 mm.

COMPARISON OF EXAMPLE 1 WITH COMPARATIVE EXAMPLE 1

The inventive catalyst and the comparative catalyst were tested with respect to the $NO_x$ conversion performance thereof in the NEDC-relevant temperature range. For this purpose, a drill core K1 having a diameter of 38.1 mm was taken from the inventive catalyst. Three drill cores VK1, VK2 and VK3 were taken from the comparative catalyst.

Prior to determination of a nitrogen oxide conversion performance thereof, the drill cores were synthetically aged by storing them in an atmosphere comprising 10% by volume of oxygen and 10% by volume of steam in nitrogen at 750° C. over a period of 16 hours.

In a dynamic laboratory model gas system, two drill cores connected in series to give an exhaust gas cleaning system were examined in each case with respect to the nitrogen oxide conversion performance thereof (the stated sequence corresponds (from left to right) to the flow direction of the test gas:

VSYS comparative system: VK1+VK2
SYS test system according to invention: K+VK3.

The respective configuration was tested in an NEDC simulation test. In this test, the test gas mass flow rate, the temperature profile and the test gas composition were matched to the emissions of a Euro V certified diesel engine with a capacity of 3 liters. The test gas which simulates the corresponding exhaust gas comprised the components nitrogen monoxide (NO), nitrogen dioxide ($NO_2$), oxygen ($O_2$), carbon dioxide ($CO_2$), steam ($H_2O$) and nitrogen ($N_2$). Instead of urea, ammonia was metered in as the reducing agent, with a selected ratio $\alpha = NH_3 NO_x = 1$. For the necessary scale-down of the exhaust gas mass flow rate, a design volume of the SCR catalyst used of 4 liters was assumed.

In the test described, for the VSYS comparative system, an emission in the NEDC of 65 mg/km was determined. The SYS test system comprising the inventive catalyst exhibited nitrogen oxide emission reduced by 15% in comparison, namely 55 mg/km.

Figure 3:
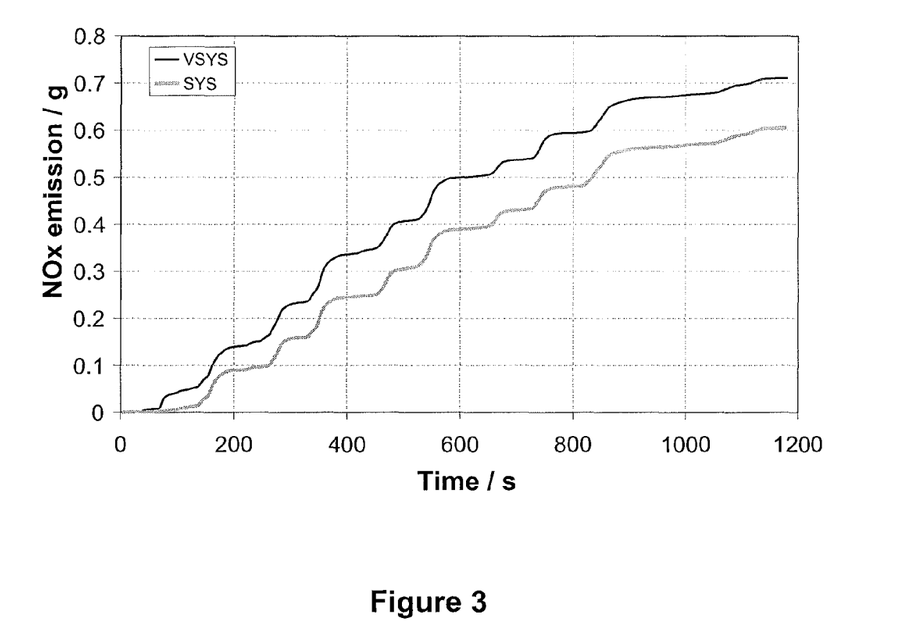
FIG. 3: Cumulated nitrogen oxide emissions of a prior art system VSYS comprising two conventional SCR catalysts connected in series and of an SYS test system comprising an inventive catalyst and a downstream conventional SCR catalyst in a simulated NEDC test cycle.

FIG. 3 shows the cumulated emissions of the SYS test system and of the VSYS comparative system over the entire test run. The exact assessment of the cumulated emission runs makes it clear that the inventive catalyst, especially within the cold start range up to test time approx. 150 seconds, has considerably improved cleaning action. In addition, a reduced cumulated $NO_x$ emission is observed over the entire text.

EXAMPLE 2

A coating suspension of the following composition was made up (the amounts are based on the volume L of the resulting catalyst):

| | |
|---|---|
| 45 g/L | of a lanthanum-doped aluminum/cerium mixed oxide; |
| 71 g/L | of a cerium oxide-doped aluminum/magnesium mixed oxide |
| 1.06 g/L | of palladium; |
| 36 g/L | of cerium/zirconium mixed oxide with addition of 16.67% by weight of BaO; |
| 66 g/L | of cerium oxide; |
| 27.8 g/L | of SAPO-34 exchanged with 3.0% by weight of copper; |
| 13.9 g/L | of an $La_2O_3$-stabilized cerium/zirconium mixed oxide; |
| 4.6 g/L | of an $La_2O_3$-stabilized aluminum oxide; |
| 4.6 g/L | of $SiO_2$ formed from commercially available silica sol |

A coating suspension thus obtained was used to coat a flow honeycomb as specified in example 1, which was dried and calcined.

EXAMPLE 3

An inventive catalyst was produced in the form of a zoned catalyst according to FIG. 2b). The composition of the front, inflow zone corresponded to the lower zone (material zone 3b) in example 1 and was applied in an amount of 320 g/L of zone volume.

The composition of the rear, outflow zone corresponded to the upper zone (material zone a) in example 1 and was applied in an amount of 144 g/L of zone volume.

The length of the front zone (material zone 3a) was 50.8 mm, and that of the rear zone (material zone 3b) 25.4 mm.

EXAMPLE 4

An inventive catalyst was produced in the form of a zoned catalyst and was provided with a separate, downstream SCR catalyst.

The composition of the front, inflow zone corresponded to the upper zone (material zone 3a) in example 1 and was applied in an amount of 144 g/L of zone volume.

The rear, outflow zone had the following composition (the amounts are based on the zone volume):

| | |
|---|---|
| 0.77 g/L | of platinum; |
| 1.54 g/L | of palladium; |
| 53.8 g/L | of a lanthanum-doped aluminum/cerium mixed oxide; |
| 93.1 g/L | of a cerium oxide-doped aluminum/magnesium mixed oxide; |
| 74.2 g/L | of a cerium/zirconium/praseodymium mixed oxide; |
| 70.4 g/L | of a cerium/zirconium/lanthanum mixed oxide with addition of 9.2% by weight of BaO; |
| 26.2 g/L | of a cerium/zirconium/praseodymium mixed oxide with addition of 13.6% by weight of SrO |

The length of the front, inflow zone was 25.4 mm, and that of the rear, outflow zone 50.8 mm.

The separate downstream SCR catalyst had the composition of the upper zone (material zone 3a) in example 1 and was applied in an amount of 144 g/L to a flow honeycomb.

EXAMPLE 5

An inventive catalyst was produced in the form of a layer catalyst according to FIG. 1.

For production of the second material zone (3b) to be applied directly to the flow honeycomb, a coating suspension of the following composition was made up (the amounts are based on the volume L of the resulting catalyst):

| | |
|---|---|
| 0.53 g/L | of platinum; |
| 1.06 g/L | of palladium; |
| 37 g/L | of a lanthanum-doped aluminum/cerium mixed oxide; |
| 64 g/L | of a cerium oxide-doped aluminum/magnesium mixed oxide; |
| 51 g/L | of a cerium/zirconium/praseodymium mixed oxide; |
| 48.4 g/L | of a cerium/zirconium/lanthanum mixed oxide with addition of 9.2% by weight of BaO; |
| 18 g/L | of a cerium/zirconium/praseodymium mixed oxide with addition of 13.6% by weight of SrO. |

This suspension was used to coat a flow honeycomb as described in example 1. This was followed by drying and calcination.

For the production of the first material zone (3a), a coating suspension which comprised 120 g/L of a commercially available chabazite zeolite exchanged with 2.5% by weight of CuO and having a molar SiO$_2$/Al$_2$O$_3$ ratio of 35 was applied to the material zone (3b).

EXAMPLE 6

An inventive catalyst was produced in the form of a layer catalyst according to FIG. 1.

For production of the second material zone (3b) to be applied directly to the flow honeycomb, a coating suspension of the following composition was made up (the amounts are based on the volume L of the resulting catalyst):

| | |
|---|---|
| 0.35 g/L | of platinum; |
| 3.18 g/L | of gold; |
| 42 g/L | of a lanthanum-doped aluminum mixed oxide; |
| 69 g/L | of a cerium oxide-doped aluminum/magnesium mixed oxide; |
| 52 g/L | of cerium oxide; |
| 36.8 g/L | of a cerium/zirconium/lanthanum mixed oxide with addition of 15.7% by weight of BaO; |
| 16.7 g/L | of a cerium/zirconium/praseodymium mixed oxide with addition of 5% by weight of K$_2$O. |

This suspension was used to coat a flow honeycomb as described in example 1. This was followed by drying and calcinations.

For the production of the first material zone (3a), a coating suspension which comprised 100 g/L of SAPO-34 exchanged with 1% by weight of Cu was applied to the material zone (3b).

EXAMPLE 7

A coating suspension of the following composition was made up (the amounts are based on the volume L of the resulting catalyst):

| | |
|---|---|
| 40 g/L | of a lanthanum-doped aluminum/cerium mixed oxide; |
| 80 g/L | of a lanthanum-doped cerium/zirconium/praseodymium mixed oxide; |
| 80 g/L | of cerium oxide; |
| 133 g/L | of SAPO-34 exchanged with 3.0% by weight of copper; |
| 67 g/L | of an La$_2$O$_3$-doped cerium/zirconium mixed oxide. |

The coating suspension thus obtained was used to coat a flow honeycomb as specified in example 1, which was dried and calcined.

COMPARATIVE EXAMPLE 2

In analogy to example 7, a flow honeycomb was coated with a single layer, except that this comprised merely

| | |
|---|---|
| 133 g/L | of SAPO-34 exchanged with 3.0% by weight of copper; and |
| 67 g/L | of an La$_2$O$_3$-doped cerium/zirconium mixed oxide. |

COMPARISON OF EXAMPLE 7 WITH COMPARATIVE EXAMPLE 2

The coated flow honeycomb produced according to example 7 (referred to hereinafter as K7) and the coated flow honeycomb produced according to comparative example 2 (called VK4 hereinafter) were compared in a laboratory model gas system with regard to the NOx conversion U$_{NOx}$ as follows:

Gas Composition (Constant for All Phases)
H$_2$O: 5%
O$_2$: 5%
N$_2$: remainder
Conditioning phase: 600° C.
Cooling phase: T=600→150° C.
Test phase: T=150° C.

During the test phase, a constant temperature is first awaited. From t=0 seconds, 200 ppm of NO are additionally metered into the gas mixture. The concentration profile of nitrogen oxides (NO and NO$_2$) downstream of catalyst is observed over the time t. The measured nitrogen oxide concentrations c$_{outlet}$(NOx) and the amount of NO metered in c$_{inlet}$(NOx) are used to determine the NOx conversion X$_{NOx}$ as follows:

$$X_{NO_x}[\%] = \left[\left(1 - \frac{c_{outlet}(NO_x)}{c_{inlet}(NO_x)}\right) \cdot 100\right]$$

Figure 4:
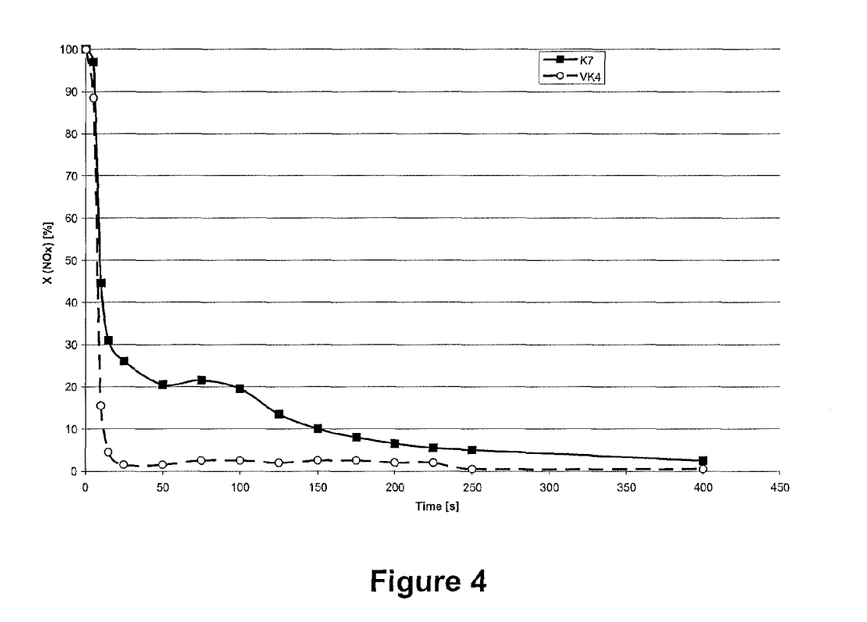
FIG. 4: NOx conversion of inventive catalyst K7 according to example 7 compared to comparative catalyst VK4 according to comparative example 2.

The results can be found in FIG. 4. This shows that the NOx conversion of the inventive catalyst K7, especially in the initial phase of the metered addition (between 10 and 200 seconds), is up to 25% higher than the NOx conversion of the comparative catalyst VK4.

EXAMPLE 8

A coating suspension of the following composition was made up (the amounts are based on the volume L of the resulting catalyst):

| | |
|---|---|
| 60 g/L | of a lanthanum-doped aluminum/cerium mixed oxide; |
| 120 g/L | of a lanthanum-doped cerium/zirconium/praseodymium mixed oxide; |
| 120 g/L | of cerium oxide; |
| 100 g/L | of zeolite beta exchanged with 10.0% by weight of copper. |

The coating suspension thus obtained was used to coat a flow honeycomb as specified in example 1, which was dried and calcined.

The invention claimed is:

1. A catalyst for removal of nitrogen oxides from an exhaust gas of a diesel engine, comprising
   a support body of length L, and
   a catalytically active coating having one or more material zones, the catalytically active coating comprising:
      a zeolite or a zeolite-structured compound containing 1-10% by weight of copper, based on the total weight of the zeolite or of the zeolite like zeolite-structured compound, the zeolite or the zeolite-structured compound having an average mean pore size of less than 4 Angstrom and being selected from the group consisting of chabazite, SAPO-34, and ALPO-34; and
      at least one compound selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate,. and mixtures thereof.

2. The catalyst as claimed in claim 1, wherein
the catalytically active coating additionally comprises at least one of cerium oxide and a cerium/zirconium mixed oxide.
3. The catalyst as claimed in claim 2, wherein
at least one of the cerium oxide and the cerium/zirconium mixed oxide is a support oxide for the at least one compound.
4. The catalyst as claimed in claim 1, wherein
the catalytically active coating additionally comprises one or more noble metals selected from the group consisting of platinum, palladium, rhodium, iridium, ruthenium, gold, silver, mixtures thereof, and alloys thereof.
5. The catalyst as claimed in claim 4, wherein
the catalytically active coating comprises two material zones, the first material zone comprising the zeolite or the zeolite-structured compound, and the second material zone comprising the one or more noble metals.
6. The catalyst as claimed in claim 1, wherein
the catalytically active coating comprises two material zones, the first material zone comprising the zeolite or the zeolite-structured compound, and the second material zone comprising the at least one compound.
7. The catalyst as claimed in claim 6, wherein,
the second material zone covers the support body and the first material zone covers the second material zone on a side proximal to an exhaust gas flow channel through the support body.
8. The catalyst as claimed in claim, wherein
the second material zone covers the support body over the entire length L, and the first material zone covers the second material zone completely on the side proximal to the exhaust gas flow channel.
9. The catalyst as claimed in claim 6, wherein
the two material zones are arranged successively on the support body in a flow direction of the exhaust gas, with the second material zone arranged on an inflow side and the first material zone arranged on an outflow side.
10. The catalyst as claimed in claim 6, wherein
the two material zones are arranged successively on the support body in a flow direction of the exhaust gas, with the first material zone arranged on an inflow side and the second material zone arranged on an outflow side.
11. A process for removing nitrogen oxides from an exhaust gas of a diesel engine, wherein
the exhaust gas to be cleaned has an air ratio $\lambda$ greater than 1 and is passed over a catalyst as claimed in claim 1.
12. The process as claimed in claim 11, wherein
ammonia or a compound decomposable to ammonia is supplied, as a reducing agent, to the exhaust gas to be cleaned, and
the ammonia or the compound decomposable to ammonia is supplied from a source independent of the engine, and at a location upstream of or at an entry into the catalyst.
13. The process as claimed in claim 11, wherein
the exhaust gas to be cleaned is additionally passed over a catalyst that accelerates a selective catalytic reduction of nitrogen oxides with ammonia.
14. An apparatus, comprising
an SCR catalyst arranged on the outflow side of a catalyst as claimed in claim 1.
15. A process for removing nitrogen oxides from an exhaust gas of a diesel engine, wherein
the exhaust gas to be cleaned has an air ratio $\lambda$ greater than 1 and is passed through the apparatus of claim 14.
16. A catalyst for removal of nitrogen oxides from an exhaust gas of a diesel engine, comprising
a support body of length L, and
a catalytically active coating having one or more material zones, the catalytically active coating comprising:
a zeolite or a zeolite-structured compound containing 1-10% by weight of copper, based on the total weight of the zeolite or of the zeolite-structured compound, the zeolite or the zeolite-structured compound being selected from the group consisting of chabazite, SAPO-34, and ALPO-34, and zeolite-$\beta$; and
at least one compound selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate, and mixtures thereof
wherein the catalytically active coating comprises two material zones, the first material zone comprising the zeolite or the zeolite-structured compound, and the second material zone comprising the at least one compound, and
wherein the two material zones are arranged successively on the support body in a flow direction of the exhaust gas, in a manner either that:
the second material zone is arranged on an inflow side and the first material zone is arranged on an outflow side; or
the first material zone is arranged on an inflow side and the second material zone is arranged on an outflow side.
17. The catalyst as claimed in claim 16, wherein
the second material zone is arranged on the inflow side and the first material zone is arranged on the outflow side.
18. The catalyst as claimed in claim 16, wherein
the first material zone is arranged on the inflow side and the second material zone is arranged on the outflow side.
19. An apparatus, comprising
an SCR catalyst; and
a catalyst for removal of nitrogen oxides from an exhaust gas of a diesel engine, the catalyst for removal of nitrogen oxides comprising
a support body of length L, and
a catalytically active coating having one or more material zones, the catalytically active coating comprising:
a zeolite or a zeolite-structured compound containing 1 10% by weight of copper, based on the total weight of the zeolite or of the zeolite-structured compound, the zeolite or the zeolite-structured compound being selected from the group consisting of chabazite, SAPO-34, and ALPO-34, and zeolite-$\beta$; and
at least one compound selected from the group consisting of barium oxide, barium hydroxide, barium carbonate, strontium oxide, strontium hydroxide, strontium carbonate, praseodymium oxide, lanthanum oxide, magnesium oxide, magnesium/aluminum mixed oxide, alkali metal oxide, alkali metal hydroxide, alkali metal carbonate, and mixtures thereof,
wherein an SCR catalyst is arranged on the outflow side of the catalyst for removal of nitrogen oxides.
20. The apparatus as claimed in claim 19, wherein
the catalytically active coating of the catalyst for removal of nitrogen oxides additionally comprises at least one of cerium oxide and a cerium/zirconium mixed oxide.

* * * * *